Nov. 3, 1964   C. E. PAUL   3,155,876
ELECTRICAL CAPACITOR PROTECTIVE ARRANGEMENT
Filed May 29, 1961

Inventor:
Carl E. Paul,
by Sidney Greenberg
His Attorney.

3,155,876
ELECTRICAL CAPACITOR PROTECTIVE
ARRANGEMENT
Carl E. Paul, Glens Falls, N.Y., assignor to General
Electric Company, a corporation of New York
Filed May 29, 1961, Ser. No. 113,463
5 Claims. (Cl. 317—12)

The present invention relates to electrical capacitors, especially of the type designed for use in fluorescent lamp ballasts, and more particularly concerns a protective arrangement for electrical capacitors of this type.

In conventional fluorescent lamp ballast constructions, the metal-encased ballast capacitor is normally held in place in the ballast device by a potting compound composed principally of asphalt. It has been found that when failures occur in such capacitors during operation of the ballast, in many cases the failure is due to a "thermal run-away" condition wherein the temperature within the capacitor rises rapidly, and pressures are developed in the capacitor which eventually rupture the metal capacitor casing. Following such rupture, the liquid dielectric impregnant normally contained in such capacitors may escape and come into contact with the asphalt potting compound. The liquid mixture thereby formed may then leak out of the fluorescent lamp fixture and cause damage to the fixture, to furniture, and other objects in the vicinity.

It is an object of the invention to provide a protective arrangement for electrical capacitors, especially of the fluorescent lamp ballast type, which will avoid the above-described problem.

It is a particular object of the invention to provide a protective arrangement for ballast capacitors of the above type which will provide protection against rupture of the capacitor casing resulting from excessive temperatures developed in the capacitor during its operation.

It is another object to provide a protective arrangement of the above type which is simple and is readily and economically applied to conventional ballast devices.

It is a further object of the invention to provide a fluorescent lamp ballast incorporating a thermally protected capacitor of the above type.

Other objects and advantages will become apparent from the following description and appended claims.

With the above objects in view, the present invention relates to an apparatus for preventing rupture of capacitor casing due to thermal run-away, which comprises in combination, a capacitor including a sealed casing containing a capacitor section and having external terminals mounted on the casing, the capacitor being subject to failure conditions causing change in the dimensions of the casing resulting in movement of the external terminals a predetermined distance prior to rupture of the casing, and electrically conducting means arranged in the path of movement of the terminals and spaced therefrom not more than the aforementioned predetermined distance for causing a short circuit between the terminals upon contact therewith, whereby the operation of the capacitor is automatically discontinued prior to rupture of the casing due to the aforementioned failure conditions.

The invention will be better understood from the following description taken in conjunction with the accompanying drawing, in which.

Figure 1:
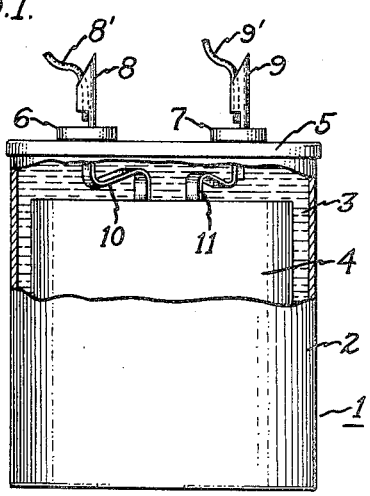
FIGURE 1 is a view in elevation, partly broken away, of an electrical capacitor which may be employed in accordance with the present invention.

Referring now to the drawing, FIGURE 1 shows an electrical capacitor 1 comprising casing 2, usually composed of a metal such as steel, containing dielectric liquid 3 such as chlorinated diphenyl and capacitor section 4 immersed in and impregnated by the dielectric liquid. Capacitor section 4 is of a conventional convolutely wound roll construction and is formed, as well known in the art, of a pair of metal electrode foils, such as aluminum, and interposed dielectric material, such as kraft paper, all interwound into a compact roll. Casing 2 is hermetically sealed by cover 5 which is provided with insulating bushings 6 and 7 and external terminals 8 and 9 connected respectively with tap straps 10 and 11, which in turn are respectively electrically connected to the wound electrode foils of opposite polarity of capacitor section 4. As is seen from FIGURE 1, terminals 8 and 9 are preferably somewhat sharpened at their ends, the purpose of which is more fully explained below. Terminals 8 and 9 may be of any suitable construction which has, or lends itself to the provision of, sharp ends. Typically, they may be of a form which are crimped around the external wire leads 8', 9', as shown. The wire leads may be secured to terminals 8 and 9, however, in any other manner differing from that shown, care being taken that they do not interfere with the penetrating function of the terminals as described below.

It has been found that as a result of thermal run-way conditions in ballast capacitors of the type above-described, considerable pressure is generated in capacitor container 2 due, for example, to hydrostatic pressure of dielectric liquid 3 which becomes heated and to gases generated by thermally-activated changes in the dielectric liquid and dielectric paper in the capacitor roll. Such pressures have been found to cause cover 5 of the capacitor to bulge outwardly and as a consequence displace the bushings and associated terminals a certain distance in an axial direction. Continued generation of such pressures under the thermal run-away conditions ultimately causes casing 2 or cover 5 to rupture or to separate from one another, as a result of which dielectric liquid 3 escapes into the surrounding asphalt potting material in which the capacitor is embedded. The mixture of dielectric liquid and asphalt material may then leak out of the fluorescent lamp fixture and cause damage to the fixture or to objects below onto which the liquid mixture may drip.

Figure 2A:
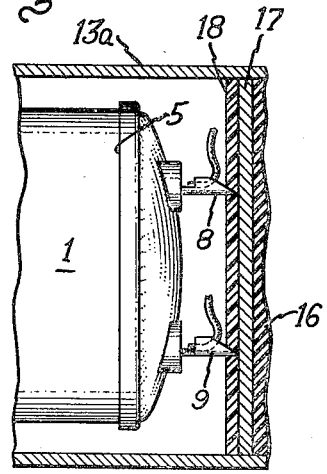
FIGURE 2a is an enlarged detail view of a portion of the FIGURE 2 arrangement.
Figure 2:
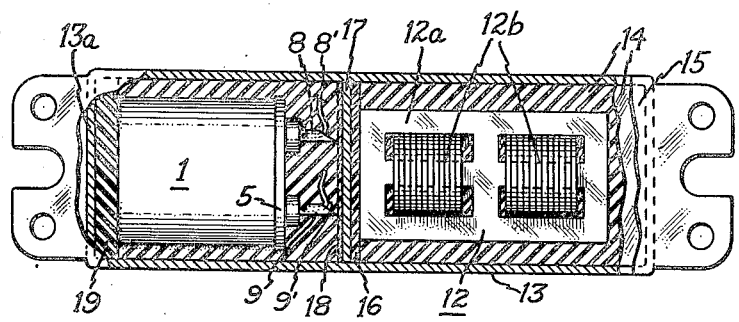
FIGURE 2 is a plan view of a fluorescent lamp ballast arrangement embodying the invention.

FIGURE 2 shows the metal encased capacitor 1 of FIGURE 1 arranged as a ballast component in operative combination with ballast transformer 12 comprising iron core 12a and windings 12b in an arrangement suitable for use with fluorescent lamp ballast circuits. Capacitor 1 and transformer 12 are disposed in a metal housing 13 containing potting material 14, such as an asphalt compound, in which the capacitor and transformer are embedded, housing 13 being closed by cover 15. The electrical connection of capacitor terminals 8, 9 to transformer 12 and other details of the ballast circuit are conventional and well known, a typical ballast circuit being disclosed, for example, in the patent to Mead 2,961,606, and accordingly a description of the circuit or electrical interconnection, which form no part of the present invention, is considered unnecessary herein.

In accordance with the present invention, capacitor 1 is so arranged in the ballast unit that its operation is automatically discontinued upon a change of predetermined amount in its dimensions as a result of thermal run-away conditions therein. The axial outward bulging of cover 5 which invariably precedes rupture of capacitor casing 2 due to such conditions is utilized to de-energize the failing capacitor by locating the capacitor with its terminals 8, 9 in proximity to a conducting member or shorting bar, so that upon such bulging of cover 5, terminals 8, 9 come into contact with the shorting member. The capacitor is thus short-circuited and ceases operation, thereby halting further rise in temperature and generation of pressures therein.

In the embodiment shown in FIGURE 2, spacer member 16 of suitable electrically insulating material such as cardboard is arranged against the end of transformer 12 extending across the interior of housing 13. A metallic sheet 17 or other electrically conducting member serving as a shorting bar lies against spacer member 16. A relatively thin layer 18 of suitable electrically insulating material, such as a synthetic resin coating, overlies the face of shorting member 17 and serves principally to avoid premature shorting of the capacitor terminals as, for example, during the assembly of the ballast components. Capacitor 1 is arranged with its sharpened terminals 8, 9 directed towards shorting member 17 and with the terminal ends lying in a plane generally parallel to and spaced a predetermined distance from the surface of member 17. To facilitate proper spacing of capacitor terminals 8, 9 from shorting member 17 during assembly and to maintain such spacing in the originally assembled condition, rear spacer member 19 of cardboard or the like is interposed between end wall 13a of housing 13 and the bottom end of capacitor 1. The thus properly located capacitor is encapsulated in housing 13 (along with transformer 12) with an asphalt-containing potting material 14 in accordance with known procedures.

As will be understood, leads 8′, 9′, as well as other conductors forming the ballast circuit, may pass through laminations 16, 17, 18 in appropriate places for interconnecting the ballast components.

Upon bulging of capacitor cover 5 outwardly due to the onset of thermal run-away conditions in the capacitor, as shown in FIGURE 2a, terminals 8 and 9 move toward metal sheet 17, and in the course of such movement the sharp ends of the terminals pierce the thin insulating layer 18 and come into contact with underlying metal sheet 17. The capacitor thereby is shorted out and ceases operation before case rupture occurs.

As will be evident, the particular shape and dimensions (other than thickness) of the metal sheet 17 and spacer 16 are not significant, it being necessary only that metal sheet 17 be in the path of movement of terminals 8, 9 and that spacer member 16 maintain the necessary spacing distance. Metal sheet 17 may be supported in the desired position in any suitable manner, and the presence of spacer 16 is not always necessary. If desired, metal sheet 17 may be in the form of a metallic coating on the surface of spacer 16.

In a typical ballast capacitor arrangement, the spacing between terminals 8, 9 and the adjacent surface of metal sheet 17 will normally be about ⅛ inch. The particular spacing distance will, however, vary denpending upon the size and nature of the capacitor and other factors which are known to affect the extent of bulging of the capacitor ends. The actual extent of dimensional change in any particular type of ballast capacitor due to thermal runaway conditions can be readily ascertained within relatively narrow limits so that the requisite spacing of the capacitor terminals from the shorting member to effect shorting before the capacitor case ruptures is easily determinable.

Although not shown, it may also be feasible to arrange the capacitor so that its terminals short directly on core 12a of transformer 12 or on the metal core clamp (not shown) often associated therewith.

Figure 3:
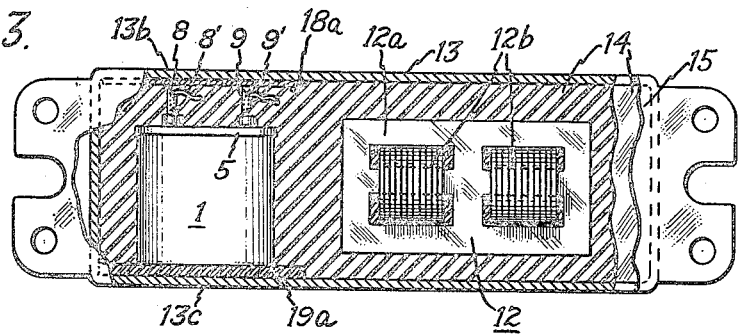
FIGURE 3 is a plan view of another embodiment of a protective arrangement according to the invention.

FIGURE 3 shows another embodiment of the invention which requires fewer parts than that shown in FIGURE 2. In this construction, capacitor 1 is placed with its terminals 8, 9 directed toward sidewall 13b of metal housing 13 which is coated with an electrically insulating layer 18a on its interior face in the region adjacent capacitor terminals 8, 9. In this embodiment, wall 13b of housing 13 serves as a shorting member equivalent to metal sheet 17 of the FIGURE 2 embodiment.

Spacer member 19a of cardboard or the like is interposed between the bottom end of capacitor 1 and sidewall 13c of housing 13 and serves to properly space terminals 8, 9 from sidewall 13b, in a manner analogous to that described in connection with spacer 19 of FIGURE 2. In the FIGURE 3 form, as in that of FIGURE 2, sharpened terminals 8, 9 which are initially spaced a predetermined distance from wall 13b move toward the latter during bulging of cover 5 and, after piercing insulating layer 18a, come into contact with metal wall 13b to short-circuit the capacitor.

There is thus provided in accordance with the invention an extremely simple yet effective protective arrangement for ballast capacitors to avoid rupture of their cases during operation with the consequent damage resulting from leakage of dielectric liquid therefrom.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Protective apparatus for electrical capacitors comprising, in combination, an electrical capacitor comprising a sealed casing containing a capacitor section and having external terminals mounted on said casing, said capacitor during operation being subject to failure conditions causing a dimensional change of said casing resulting in movement of said external terminals a predetermined distance prior to rupture of said sealed casing, and means arranged in the path of movement of said terminals and spaced therefrom not more than said predetermined distance for causing a short circuit between said terminals upon contact therewith, whereby the operation of said capacitor is automatically discontinued prior to rupture of said casing due to said failure conditions.

2. Protective apparatus for electrical capacitors comprising, in combination, an electrical capacitor comprising a sealed casing containing a capacitor section and dielectric liquid in which said section is immersed and having external terminals mounted on said casing, said capacitor during operation being subject to failure conditions causing a dimensional change of said casing resulting in movement of said external terminals a predetermined distance prior to rupture of said sealed casing, and electrically conducting means arranged in the path of movement of said terminals and spaced therefrom not more than said predetermined distance for causing a short circuit between said terminals upon contact therewith, whereby the operation of said capacitor is automatically discontinued prior to rupture of said casing due to said failure conditions.

3. Protective apparatus for electrical capacitors comprising, in combination, a housing, an electrical capacitor mounted within said housing, said capacitor comprising a sealed casing containing a capacitor section and dielectric liquid in which said capacitor section is immersed and having a pair of externally projecting electrically conductive terminals of opposite polarity mounted on said casing, said capacitor being subject to failure conditions causing bulging of said casing resulting in outward movement of said externally projecting terminals a predetermined distance prior to rupture of said casing, and electrically conducting means arranged in the path of movement of said terminals and spaced therefrom not more than said predetermined distance for causing a short-circuit between said terminals upon contact therewith, whereby the operation of said capacitor is automatically discontinued prior to rupture of said casing due to said failure conditions.

4. Protective apparatus for electrical capacitors comprising, in combination, a housing having an electrically conductive wall portion, an electrical capacitor mounted within said housing, said capacitor comprising a sealed casing containing a capacitor section and a dielectric liquid in which said capacitor section is immersed and having a pair of externally projecting electrically conducting terminals of opposite polarity mounted on said casing, said capacitor being subject to failure conditions causing bulging of said casing resulting in outward movement of said externally projecting terminals a predetermined distance prior to rupture of said casing, said capacitor being arranged with said terminals spaced not more than said predetermined distance from said housing wall portion and with the latter in the path of movement of said terminals for causing a short-circuit between said terminals upon contact therewith, whereby the operation of said capacitor is automatically discontinued prior to rupture to said casing due to said failure conditions.

5. Protective apparatus for electrical capacitors comprising a housing, an electrical capacitor mounted within said housing, said capacitor comprising a sealed casing containing a capacitor section and dielectric liquid in which said capacitor section is immersed and having a pair of externally projecting electrically conductive terminals of opposite polarity mounted on said casing, said terminals having sharp projecting ends lying in a plane, said capacitor being subject to failure conditions causing bulging of said casing resulting in outward movement of said externally projecting terminals a predetermined distance prior to rupture of said casing, and electrically conducting means comprising a metallic surface in the path of movement of said terminals and lying in a plane substantially parallel to said first-mentioned plane and spaced therefrom not more than said predetermined distance for causing a short-circuit between said terminals upon contact therewith, said metallic surface having an electrically insulating coating thereon penetrable by said sharp projecting ends of said terminals during said movement thereof, whereby the operation of said capacitor is automatically discontinued prior to rupture of said casing due to said failure conditions.

References Cited by the Examiner
UNITED STATES PATENTS

| | | | |
|---|---|---|---|
| 2,547,085 | 4/51 | Mazzola | 317—261 |
| 2,817,727 | 12/57 | Schmeling | 200—83.2 |
| 2,877,324 | 3/59 | Oshry | 200—168 |
| 2,896,049 | 7/59 | Maier | 317—12 X |
| 3,117,194 | 1/64 | Stresan | 200—61.08 |

SAMUEL BERNSTEIN, *Primary Examiner.*

JOHN W. HUCKERT, *Examiner.*